Nov. 8, 1932.  A. W. WHEATON  1,887,078

VALVE

Filed Jan. 23, 1930

INVENTOR.
Abram W. Wheaton
BY George D. Richards
ATTORNEY.

Patented Nov. 8, 1932

1,887,078

UNITED STATES PATENT OFFICE

ABRAM W. WHEATON, OF MAPLEWOOD, NEW JERSEY, ASSIGNOR TO A. W. WHEATON BRASS WORKS, OF NEWARK, NEW JERSEY, A CORPORATION OF NEW JERSEY

VALVE

Application filed January 23, 1930. Serial No. 422,804.

This invention relates, generally, to valves; and the invention has reference, more particularly, to a novel quick opening and slower closing valve for controlling the flow of fluid through pipes.

A common and serious fault of ordinary pipe line valves is that such valves upon closing create sudden and abnormally high back pressures in their pipe lines resulting in injurious back or water hammer in the line and in the chattering of the valves. Such action is not only injurious to the pipe line and to the brackets supporting the same but also results in shortened valve life.

The principal object of the present invention is to provide a novel valve adapted for use in pipes or pipe lines and especially in tank truck pipe lines as for controlling the loading of tank trucks, which valve is of the disk type and is so constructed and arranged as to be biased to closed position, said valve comprising a simple quick operating cam mechanism for effecting the opening movement of the same, and having counterbalancing means for checking the closing movement thereof so that such movement is rendered smooth and easy and takes place without valve chattering or the occurrence of back or water hammer in the pipe line.

Another object of the present invention lies in the provision of a valve of the above character which is of simple construction, may be readily installed in a pipe line, is reliable in operation and has a long life in use.

Other objects of this invention, not at this time more particularly enumerated, will be clearly understood from the following detailed description of the same.

The invention is clearly illustrated in the accompanying drawing, in which:—

Similar characters of reference are employed in all of the hereinabove described views to indicate corresponding parts.

Figures 1, 4:
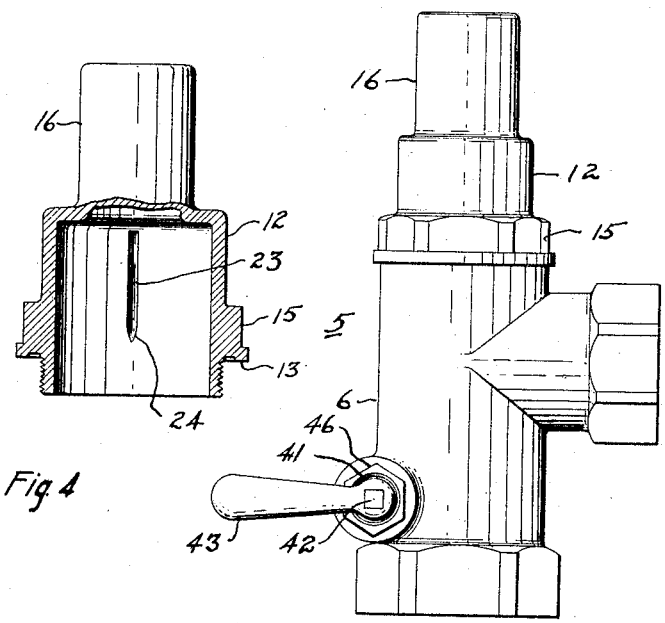
Fig. 1 is a view in elevation of the novel valve of this invention.
Fig. 4 is a part sectional view of the valve bonnet, such view being taken at right angles to the position of the bonnet illustrated in Figs. 2 and 3.

Referring now to the said drawing, the reference numeral 5 designates the novel valve of this invention. Valve 5 comprises a valve casing 6 of approximate T shape that is provided at its orifices with internal threaded portions 7, 8 and 9. Threaded portion 7 receives the externally threaded open end portion 10 of a hollow cylindrical bonnet 12, while threaded portions 8 and 9 are adapted to receive pipe sections. Bonnet 12 is formed with an annular shoulder 13 having a recess therein containing a gasket 14 that is pressed against the end of valve casing 6 to thereby secure a fluid tight joint between the valve casing and the bonnet. The exterior surface of bonnet 12 is suitably shaped at 15 to receive a wrench.

Bonnet 12 is formed with a reduced outer end portion 16 providing an interior spring receiving recess 17 for receiving a compression spring 18. Spring 18 extends longitudinally within the bonnet 12 and bears at one end against the closed end of end portion 16 and at its other end against a pressure breaker or check piston 19 forming one end portion of a plunger 20 that is movable within the valve 5. Check piston 19 is provided with an annular groove or recess in its circumferential periphery within which is positioned an expansible piston ring 21 which fits snugly against the inner cylindrical wall 22 of the bonnet 12.

The inner wall 22 of bonnet 12 is provided with two relatively narrow grooves 23 which extend longitudinally of the bonnet and terminate near the open mouth of the bonnet. Although two such grooves 23 are illustrated in the drawing it is to be understood that either a single groove or more than two grooves may be used when desired. The end of grooves 23 which terminate near the mouth of the bonnet 12 are constricted or tapered at 24. Pressure breaker or check piston portion 19 of plunger 20 is provided with an aperture 25 extending longitudinally therethrough. The walls of this aperture are formed to provide a seat to receive a ball forming a ball check valve 26. The ball valve 26 is retained in operative relation with its seat by a suitable transverse pin 27. When plunger 20 is moved upwardly within the casing of valve 5, the ball valve 26 opens permitting fluid to pass readily from above check piston 19 through aperture 25 to the underside thereof while at the same time a limited amount of fluid may flow through groove 23, thereby enabling a rapid upward or opening movement of plunger 20. When the plunger 20 is moved downwardly, however, the ball valve 26 closes, thereby preventing fluid from flowing through aperture 25 and compelling the fluid to flow entirely through the grooves 23. Inasmuch as the piston ring 21 prevents the flow of fluid around the edges of check piston 19, the fluid passing from one side of this piston to the other must flow through grooves 23 and as these grooves are of limited area, the rate at which fluid may flow around the check piston is also limited, resulting in relatively slow downward or closing movement of the plunger 20.

Plunger 20 is provided with an enlarged lower portion forming a valve disk 28 which is positioned in spaced relation from the pressure breaker or check piston portion 19. Valve disk 28 is provided at its underside with a face-washer 29 of suitable material, such as rubberized fabric. Face-washer 29 is retained in abutting relation with valve disk 28 by a washer 31 and a nut 32 that is threaded upon a central depending boss 33 formed integral with and extending from the valve disk 28. Face-washer 29 is adapted to cooperate with an annular valve seat 34 formed within the valve casing 6. A valve stem 35 is formed as a reduced continuation of the boss 33. Valve stem 35 is provided with a transverse aperture 36 of substantially rectangular cross section, which aperture is adapted to receive an operating cam 37. The upper and lower end walls of the transverse aperture 36 are beveled to provide working faces 38 which are engaged by the operating cam during the opening or closing of the valve 5.

The operating cam 37 is provided with a hub 40 having a central recess of square cross-section through which the square portion 39 of a rotatable cam shaft 41 extends. Shaft 41 extends outwardly of casing 6 and has a square end portion 42 for receiving an operating handle 43. Cam shaft 41 has cylindrical bearing portions 44 and 45 adjacent the ends of the square portion 39 which are turnably mounted in suitable bearing apertures provided in the casing 6. A packing gland 46 surrounds the cam shaft 41 and by pressing against packing positioned between gland 41 and casing 6, serves to seal the joint between shaft 41 and this housing.

Figures 2, 3:
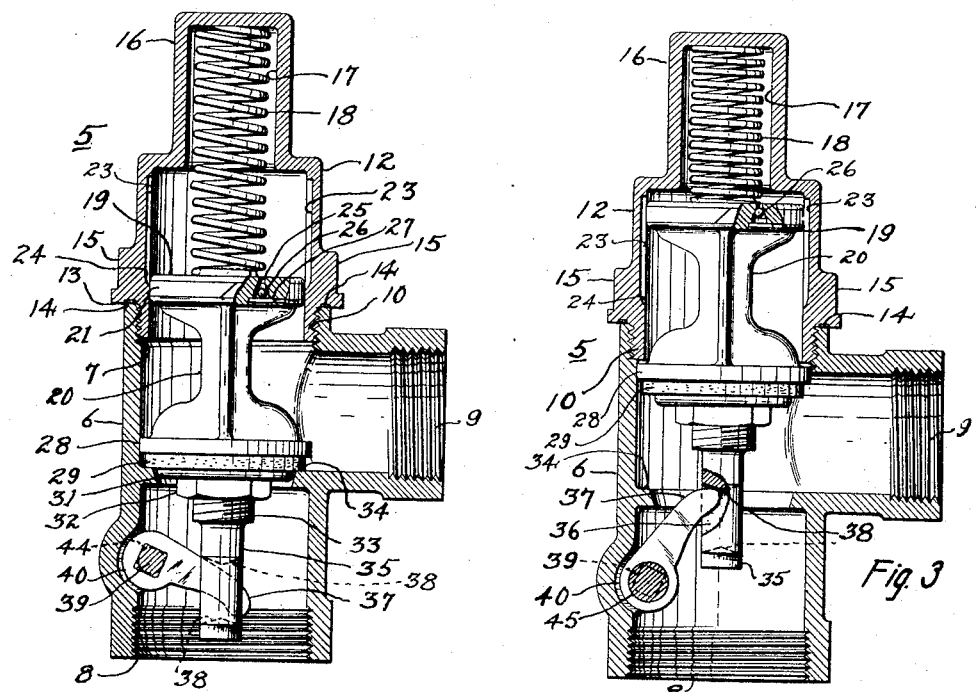
Fig. 2 is a vertical sectional view of the structure of Fig. 1 and illustrates the valve in closed position.
Fig. 3 is a view similar to Fig. 2 but illustrates the valve in open position.

In operation, assuming the novel valve of the invention to be in its closed position as illustrated in Fig. 2, to open the valve, the handle 43 is manipulated to turn cam shaft 41 in a counter clockwise direction as viewed in this figure. As the shaft 41 starts to turn, operating cam 37 also turns, causing its operating face to engage the upper working face 38 provided on valve stem 35 and thereupon force the plunger 20 upwardly against the tension of spring 18. Plunger 20 is guided in its movement by the sliding engagement of its valve disk and check piston peripheries with the inner cylindrical walls of housing 6 and bonnet 12 respectively. Owing to the ample spacing of valve disk 28 and check piston 19 from each other, the plunger 20 moves easily within valve 5 and without friction or binding. Since the check valve 26 is open during the upward movement of the plunger 20, the fluid such as oil contained within bonnet 12 above the check piston 19 readily flows through aperture 25 and joins the fluid below this piston during the upward movement of the plunger, thereby enabling an easy and quick upward or opening movement of the plunger, resulting in a rapid separation of face-washer 29 from valve seat 34. Continued turning of the shaft 41 and of cam 37 brings this cam into the position shown in Fig. 3, in which position the valve disk 28 has reached the upper limit of its travel with the valve fully open.

To close the valve, it is merely necessary to release handle 43, whereupon spring 18 operates to force plunger 20 downwardly within the casing of valve 5. This downward closing movement of plunger 20, however, is checked or slowed up by the action of the pressure breaker or check piston portion 19. As soon as this plunger starts to move downwardly, ball valve 26 closes thereupon compelling the fluid below piston 19 to flow through the relatively small grooves 23 in order to fill the region of reduced pressure above the piston 19, resulting in retarding the downward movement of the plunger. This retarded closing movement of plunger 20 and hence of valve disk 28 causes the valve disk to gradually snub or check the flow of fluid through the pipe sections connected by the valve, thereby causing fluid within these pipe sections to gradually lose its momentum. As the face-washer 29 approaches the valve seat 34, check piston 19 is moving along the lower constricted portions 24 of the grooves 23, thereby even further retarding the downward movement of the valve disk and face-washer so as to even further decelerate the movement of the fluid flowing through the pipe sections joined by the valve 5. Just before the face-washer 29 reaches its seat 34, check piston 19 passes the lower ends of the grooves 23, thereby effecting the complete deceleration of the movement of the flowing fluid in the pipe line and causing the seating of the face-washer without the occurrence of any chattering thereof or of back hammer in the pipe sections connected by the valve.

It will be noted that handle 43 has merely to be turned through a portion of a revolution to open the valve which thereupon is self-closing on the release of this handle, the closing motion being automatically retarded just sufficiently to prevent back hammer or chattering.

It will be noted that the novel valve of this invention is of extremely simple and sturdy construction and has an extremely long life in actual use.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:—

1. A valve of the class described comprising, a casing having an extension with a closed outer end, said casing extension having a longitudinal slot in the inner wall thereof, an annular valve seat formed within said casing, a plunger slidable within said casing, said plunger having a valve disk portion for engaging said valve seat and an apertured check piston portion spaced from said valve disk portion and movable within said extension, a compression spring positioned within said extension and bearing at one end against the outer end of said extension and at its other end against said plunger for urging said valve disk portion toward its valve seat, a cam mechanism engaging said plunger and operable to move said valve disk portion away from its valve seat to open position, a check valve positioned in the aperture of said check piston portion, said check valve opening during the opening movement of said plunger to allow fluid to flow therethrough for effecting the quick opening of said valve and closing during the closing movement of said valve to compel fluid to flow around said check piston portion through said longitudinal slot to effect a retarding of the closing of said valve, that part of said longitudinal slot passed over by said check piston portion, as said valve disk portion approaches its seat, being progressively constricted to effect a smooth and quiet seating of said valve disk portion upon its valve seat.

2. A valve of the class described comprising, a casing having a bonnet attached thereto, said casing having inlet and outlet openings, a valve seat provided within said casing intermediate said openings, a plunger having a check piston portion movable within said bonnet and a valve disk portion movable within said casing to and from said valve seat for respectively closing and opening said valve, said check piston portion and said valve disk portion being substantially spaced from one another, whereby said plunger is centrally guided within said casing, a compression spring contained within said bonnet and engaging said check piston portion for effecting the closing of said valve, a cam contained within said casing and engaging said plunger therewithin, said cam being operable to effect the opening of said valve against the tension of said spring, a check valve carried by said check piston portion, said check valve operating to enable the ready and quick opening of said valve while operating to check the closing movement thereof, said bonnet having longitudinal grooves in its interior surface for cooperating with said check piston portion, the part of said longitudinal grooves passed over by said check piston portion, during the final stages of the closing movement of said valve disk portion, being progressively constricted to effect a smooth and quiet seating of said valve disk portion without chattering.

In testimony, that I claim the invention set forth above I have hereunto set my hand this 18th day of January, 1930.

ABRAM W. WHEATON.